US009664348B1

(12) United States Patent
Chen et al.

(10) Patent No.: US 9,664,348 B1
(45) Date of Patent: May 30, 2017

(54) ELECTRIC FLAMELESS CANDLE

(71) Applicant: Zhu Hai Fu Yun Lighting Industrial Co., Ltd., Zhuhai, Guangdong Province (CN)

(72) Inventors: Su-Hua Chen, New Taipei (TW); Chi-Shih Lai, New Taipei (TW)

(73) Assignee: Zhu Hai Fu Yun Lighting Industrial Co., Ltd., Zhuhai (CN)

( * ) Notice: Subject to any disclaimer, the term of this patent is extended or adjusted under 35 U.S.C. 154(b) by 0 days.

(21) Appl. No.: 15/285,769

(22) Filed: Oct. 5, 2016

(51) Int. Cl.

| | |
|---|---|
| ***B60Q 1/14*** | (2006.01) |
| ***F21S 10/04*** | (2006.01) |
| ***F21S 6/00*** | (2006.01) |
| ***F21V 3/00*** | (2015.01) |
| ***F21V 23/02*** | (2006.01) |
| ***F21V 23/00*** | (2015.01) |
| *F21Y 115/10* | (2016.01) |

(52) U.S. Cl.
CPC ............. *F21S 10/046* (2013.01); *F21S 6/001* (2013.01); *F21V 3/00* (2013.01); *F21V 23/003* (2013.01); *F21V 23/02* (2013.01); *F21Y 2115/10* (2016.08)

(58) Field of Classification Search
CPC F21S 10/046; F21S 6/001; F21V 3/00; F21V 23/003; F21V 23/02
USPC .......................................................... 362/284
See application file for complete search history.

(56) References Cited

U.S. PATENT DOCUMENTS

| | | | | |
|---|---|---|---|---|
| 3,639,749 A * | 2/1972 | Beckman | F21S 10/04 | 362/392 |
| 4,328,534 A * | 5/1982 | Abe | F21S 6/001 | 313/315 |
| 4,551,794 A * | 11/1985 | Sandell | F21S 6/001 | 362/392 |
| 9,322,522 B2 * | 4/2016 | Hau | F21S 10/046 | |
| 2006/0146544 A1 * | 7/2006 | Leung | F21S 6/001 | 362/392 |
| 2011/0110073 A1 * | 5/2011 | Schnuckle | F21S 10/04 | 362/96 |
| 2012/0300459 A1 * | 11/2012 | Hau | F21S 10/046 | 362/249.02 |
| 2013/0050985 A1 * | 2/2013 | Kwok | F21S 6/001 | 362/96 |
| 2013/0286642 A1 * | 10/2013 | Patton | F21L 13/00 | 362/192 |

(Continued)

*Primary Examiner* — Bryon T Gyllstrom
(74) *Attorney, Agent, or Firm* — Muncy, Geissler, Olds & Lowe, P.C.

(57) ABSTRACT

An electric flameless candle is disclosed; the electric flameless candle includes a case, a translucent shell positioning unit, a translucent shell, a light emitting unit, a connecting unit, an electromagnetic sway module, a circuit board and a power unit. The case includes an opening. The translucent shell positioning unit is located at the opening. The translucent shell is located on the translucent shell positioning unit and includes a translucent shell base. The light emitting unit is located on the translucent shell base and in the translucent case. The connecting unit is connected to the translucent shell base. The electromagnetic sway module is located in the case. The electromagnetic sway module includes a first sway unit and a second sway unit. The second sway unit is connected to the fixing stand and located under the first sway unit. The circuit board is located in the case.

9 Claims, 7 Drawing Sheets

(56) References Cited

U.S. PATENT DOCUMENTS

| | | | | |
|---|---|---|---|---|
| 2014/0211499 A1* | 7/2014 | Fong | F21S 6/001 | 362/558 |
| 2014/0362592 A1* | 12/2014 | Lee | F21S 10/046 | 362/386 |
| 2015/0204498 A1* | 7/2015 | Hau | F21S 10/046 | 362/650 |
| 2016/0116126 A1* | 4/2016 | Johannsson | F21S 10/046 | 362/296.01 |

* cited by examiner

ELECTRIC FLAMELESS CANDLE

BACKGROUND OF THE INVENTION

1. Field of the Invention

The present invention relates to an electric flameless candle; more particularly, the present invention relates to an electric flameless candle which provides the effect of a swaying candle flame without risk of fire or air pollution.

2. Description of the Related Art

In daily life, people sometimes may light a traditional candle to increase the comfort and relaxed atmosphere of a living space; in addition, in a church or a temple, people may also light a candle for praying. The flame of a traditional candle will sway with the airflow, and the light of the swaying candle flame makes the atmosphere more romantic and relaxed.

However, the traditional candle has some limits; for example, the traditional candle should not be used in a flammable environment, and when a traditional candle is used, it should not be left unattended due to the risk of fire. Furthermore, the combustion of a traditional candle generates carbon dioxide, which can affect the air quality.

Therefore, there is a need to provide an electric candle without a flame which can provide the lighting effect of a swaying candle flame without risk of fire or air pollution.

SUMMARY OF THE INVENTION

It is an object of the present invention to provide an electric flameless candle which provides the lighting effect of a swaying candle flame without risk of fire or air pollution.

To achieve the abovementioned objects, the electric flameless candle of the present invention includes a case, a translucent shell positioning unit, a translucent shell, a light emitting unit, a connecting unit, an electromagnetic sway module, a circuit board and a power unit. The case includes an opening. The translucent shell positioning unit is located at the opening. The translucent shell is located on the translucent shell positioning unit, wherein the translucent shell includes a translucent shell base. The light emitting unit is located on the translucent shell base, and located in the translucent case. The connecting unit is connected to the translucent shell base. The electromagnetic sway module is located in the case. The electromagnetic sway module includes a first sway unit and a second sway unit. The first sway unit is connected to the connecting unit. When the first sway unit sways, the first sway unit causes the translucent shell to sway. The second sway unit is located under the first sway unit. The circuit board is located in the case. The power unit is electrically connected to the light emitting unit, the electromagnetic sway module and the circuit board. When the electromagnetic sway module is energized, a repellent magnetic field is formed between the first sway unit and the second sway unit; the repellent magnetic field causes the first sway unit to sway above the second sway unit, and the swaying of the first sway unit causes the translucent shell to sway via the connecting unit.

According to one embodiment of the present invention, the translucent shell base further includes at least one base connecting unit, the connecting unit further includes at least one correspondingly connecting unit; the at least one correspondingly connecting unit is connected to the at least one base connecting unit.

According to one embodiment of the present invention, the translucent shell positioning unit includes a positioning groove and a hole. The positioning groove is connected to the hole, the translucent shell base is located on the positioning groove, and the at least one base connecting unit passes through the hole to connect to the at least one correspondingly connecting unit.

According to one embodiment of the present invention, the electric flameless candle further includes a weight unit, and the weight unit is connected to the connecting unit and the first sway unit.

According to one embodiment of the present invention, the electric flameless candle further includes a circuit board fastening unit, and the circuit board fastening unit is located in the case and fastened to the circuit board.

According to one embodiment of the present invention, the electric flameless candle further includes a supporting unit, the supporting unit is connected to the translucent shell positioning unit, and the supporting unit supports the translucent shell.

According to one embodiment of the present invention, the light emitting unit further includes a tip, and the tip supports the translucent shell.

According to one embodiment of the present invention, an amount of the at least one base connecting unit is two, and an amount of the at least one correspondingly connecting unit is two.

According to one embodiment of the present invention, the light emitting unit is a light emitting diode.

According to one embodiment of the present invention, the first sway unit and the second sway unit are coils.

According to one embodiment of the present invention, one of the first sway unit and the second sway unit is a magnet, and the other one is a coil.

BRIEF DESCRIPTION OF THE DRAWINGS

These and other objects and advantages of the present invention will become apparent from the following descriptions of the accompanying drawings, which disclose several embodiments of the present invention. It is to be understood that the drawings are to be used for purposes of illustration only, and not as a definition of the invention.

In the drawings, wherein similar reference numerals denote similar elements throughout the several views.

DETAILED DESCRIPTION OF THE PREFERRED EMBODIMENT

Figure 1:
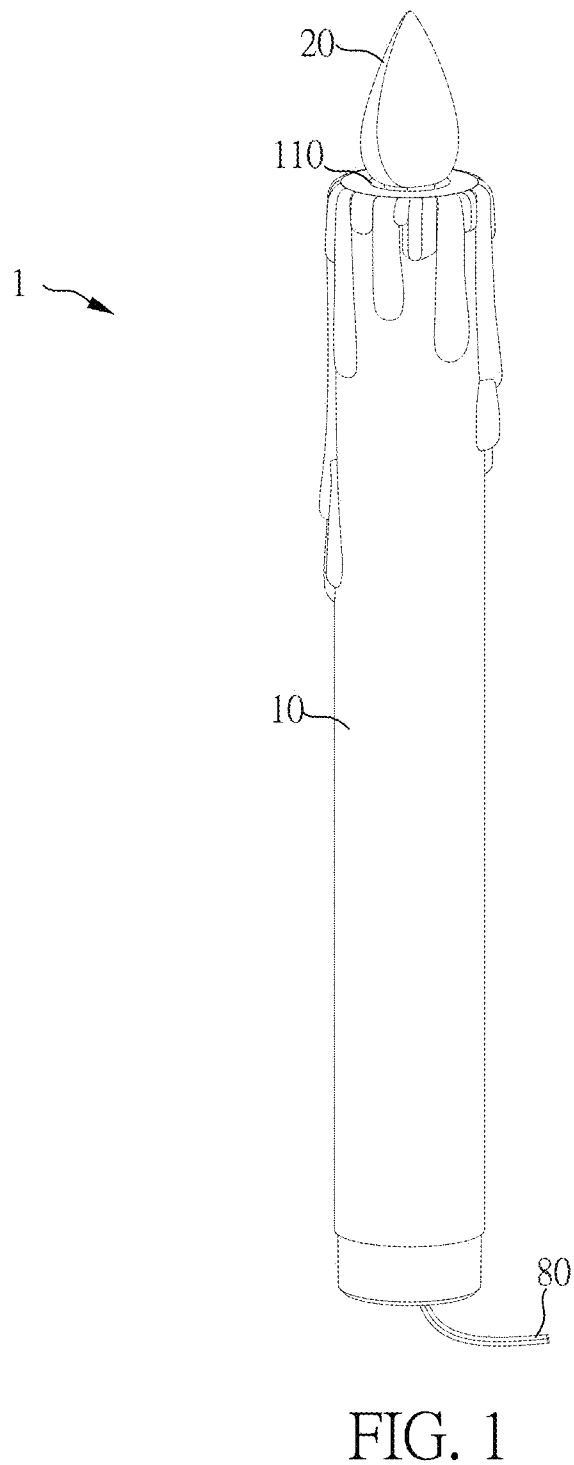
FIG. 1 illustrates a schematic drawing of the electric flameless candle in the first embodiment of the present invention.
Figure 2:
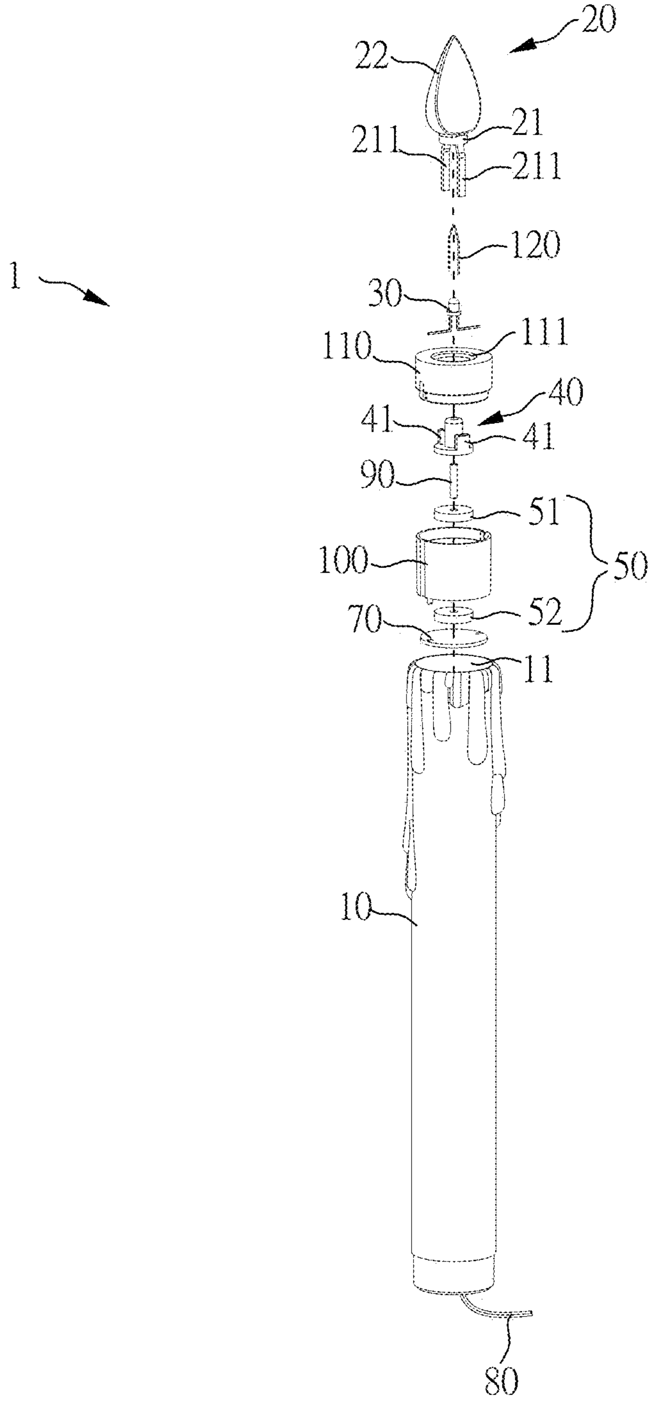
FIG. 2 illustrates an exploding perspective view of the electric flameless candle in the first embodiment of the present invention.
Figure 3:
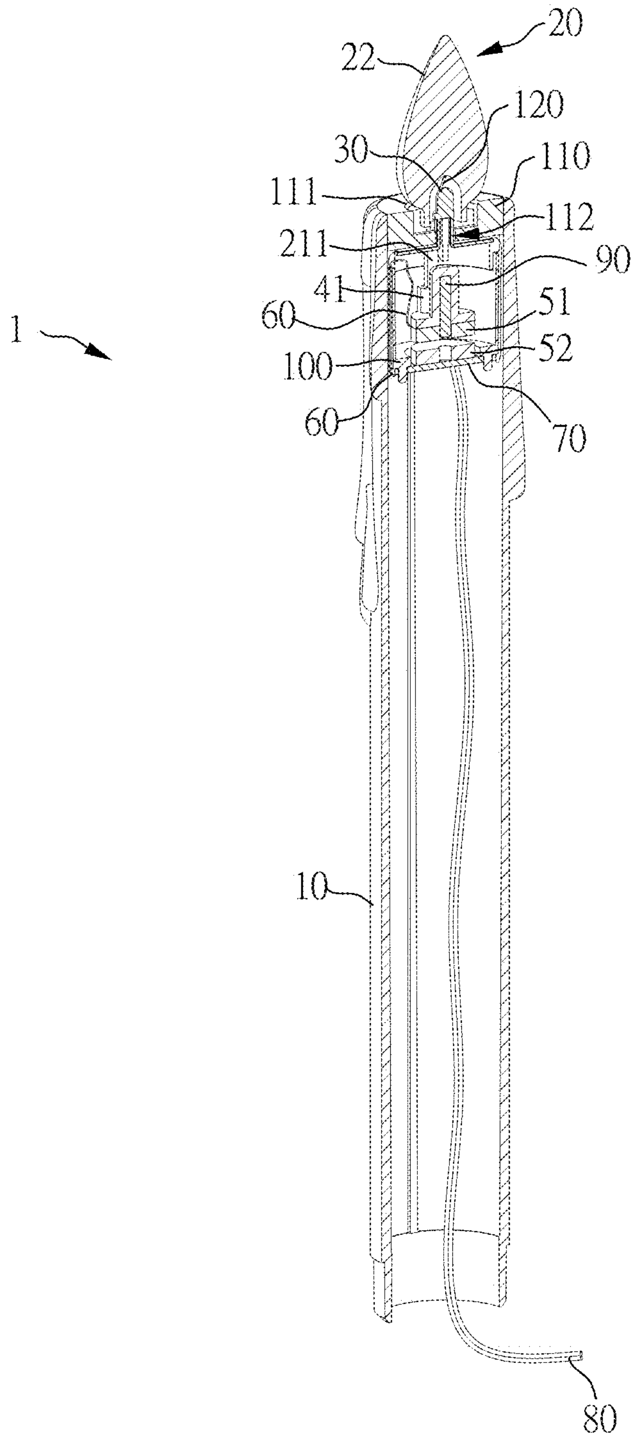
FIG. 3 illustrates a sectional view of the electric flameless candle in the first embodiment of the present invention.
Figure 4:
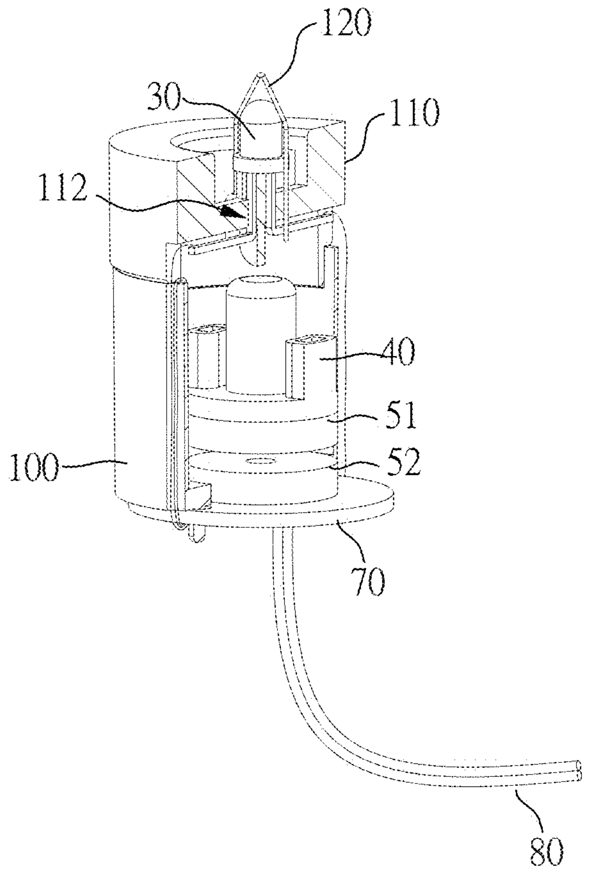
FIG. 4 illustrates a partial cross-sectional drawing of the electric flameless candle in the first embodiment of the present invention.
Figure 5:
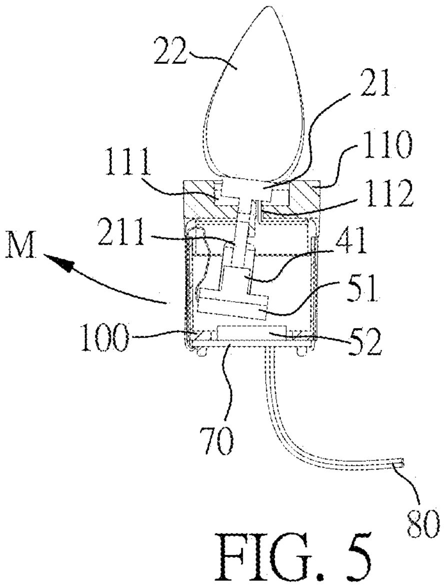
FIG. 5 illustrates a schematic drawing of the first sway unit of the electric flameless candle which sways along the sway direction in the first embodiment of the present invention.
Figure 6:
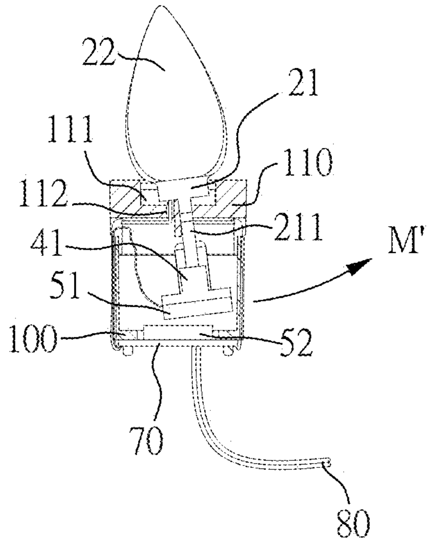
FIG. 6 illustrates a schematic drawing of the first sway unit of the electric flameless candle which sways along another sway direction in the first embodiment of the present invention.
Figure 7:
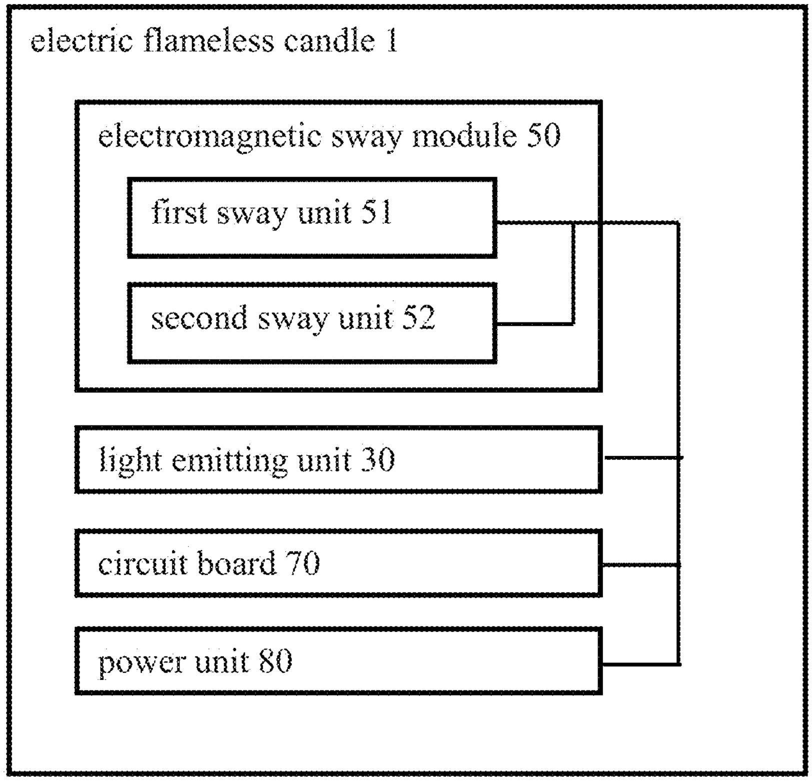
FIG. 7 illustrates a system structure drawing of the electric flameless candle in the first embodiment of the present invention.

Please refer to FIG. 1 to FIG. 7 regarding the electric flameless candle of the present invention. FIG. 1 illustrates a schematic drawing of the electric flameless candle in the first embodiment of the present invention. FIG. 2 illustrates an exploding perspective view of the electric flameless candle in the first embodiment of the present invention. FIG. 3 illustrates a sectional view of the electric flameless candle in the first embodiment of the present invention. FIG. 4 illustrates a partial cross-sectional drawing of the electric flameless candle in the first embodiment of the present invention. FIG. 5 illustrates a schematic drawing of the first sway unit of the electric flameless candle which sways along the sway direction in the first embodiment of the present invention. FIG. 6 illustrates a schematic drawing of the first sway unit of the electric flameless candle which sways along another sway direction in the first embodiment of the present invention. FIG. 7 illustrates a system structure drawing of the electric flameless candle in the first embodiment of the present invention.

As shown in FIG. 1 to FIG. 2, the electric flameless candle 1 of the first embodiment of the present invention is an electric candle which uses light to imitate the effect of a swaying flame; the electric flameless candle 1 has no flame, so the electric flameless candle 1 poses no risk of fire or air pollution. The electric flameless candle 1 includes a case 10, a translucent shell 20, a light emitting unit 30, a connecting unit 40, an electromagnetic sway module 50, a plurality of wires 60, a circuit board 70, a power unit 80, a weight unit 90, a circuit board fastening unit 100, a translucent shell positioning unit 110 and a supporting unit 120.

As shown in FIG. 1 to FIG. 3, in the first embodiment of the present invention, the case 10 is a candle-shaped tube for containing the electronic units of the electric flameless candle 1. The case 10 includes an opening 11. The opening 11 is located at the top of the candle-shaped tube of the case 10 for containing the translucent shell 20 and the translucent shell positioning unit 110. The translucent shell positioning unit 110 is located at the opening 11. The translucent shell positioning unit 110 includes a positioning groove 111 and a hole 112. The bottom of the positioning groove 111 is connected to the hole 112. The positioning groove 111 is used for locating the translucent shell 20.

As shown in FIG. 2 to FIG. 6, in the first embodiment of the present invention, the translucent shell 20 is used for imitating the shape and the lighting effect of a candle flame. The translucent shell 20 includes a translucent shell base 21 and a translucent case 22. The translucent shell base 21 includes two base connecting units 211 which are shaped as two columns. The translucent shell base 21 of the translucent shell 20 is located on the positioning groove 111 of the translucent shell positioning unit 110, and the two base connecting units 211 pass through the hole 112. The translucent case 22 is a shaped as a candle flame and made of translucent and refractive material to imitate the shape and the lighting effect of a candle flame. However, the amount of the base connecting units 211 is not limited to two, the amount can be changed according to the design requirement.

As shown in FIG. 2 to FIG. 4 and FIG. 7, in the first embodiment of the present invention, the light emitting unit 30 is a light emitting diode with a dome top for emitting light. The light emitting unit 30 is located on the translucent shell base 21, and located in the translucent case 22. When the light emitting unit 30 emits light, the translucent case 22 can present the shape and the lighting effect of a candle flame via the candle flame shape and the refractive effect of the translucent case 22.

In the first embodiment of the present invention, the connecting unit 40 is connected to the electromagnetic sway module 50 and the translucent shell 20. The connecting unit 40 includes two correspondingly connecting units 41. The two correspondingly connecting units 41 are two slots; the two column-shaped base connecting units 211 pass through the hole 112 to respectively connect to the two slots of the correspondingly connecting units 41; whereby, when the electromagnetic sway module 50 sways, the electromagnetic sway module 50 causes the translucent shell 20 to sway via the connection of the connecting unit 40. However, the amount of the correspondingly connecting unit 41 is not limited to that design; the amount can be changed according to the amount of the base connecting units 211.

As shown in FIG. 2 to FIG. 6, in the first embodiment of the present invention, the electromagnetic sway module 50 is used for causing the translucent shell 20 to sway and thereby generate the lighting effect of a swaying candle flame. The electromagnetic sway module 50 is located in the case 10; the electromagnetic sway module 50 includes a first sway unit 51 and a second sway unit 52. The first sway unit 51 and the second sway unit 52 of the first embodiment of the present invention are both coils. However, the type of the first sway unit 51 and the second sway unit 52 is not limited to a coil; for example, one of the first sway unit 51 and the second sway unit 52 can be a magnet. When the first sway unit 51 sways, the first sway unit 51 causes the translucent shell 20 to sway via the connecting unit 40. The second sway unit 52 is located under the first sway unit 51, and connected to the circuit board 70. When the electromagnetic sway module 50 is energized, a repellent magnetic field will be formed between the first sway unit 51 and the second sway unit 52. The repellent magnetic field keeps the first sway unit 51 away from the second sway unit 52, allowing the first sway unit 51 to sway above the second sway unit 52, and the swaying first sway unit 51 causes the translucent shell 20 to sway via the connecting between the base connecting units 211 and the correspondingly connecting units 41. When the translucent shell 20 sways, the hole 112 of the translucent shell positioning unit 110 can limit the degree of swaying of the base connecting units 211 to represent the effect of a candle flame swaying slightly in an air current.

In the first embodiment of the present invention, the weight unit 90 is a circular shaft made of metal; the weight unit 90 is located in the connecting unit 40 and connected to the connecting unit 40 and the first sway unit 51. The weight unit 90 is used for increasing the weight of the first sway unit 51, allowing the first sway unit 51 to sway stably, to imitate the effect of a candle flame swaying slightly in an air current. The circuit board fastening unit 100 is located in the case 10, and the circuit board fastening unit 110 is fastened to the circuit board 70, allowing the position of the circuit board 70 and the second sway unit 52 located on the circuit board 70 to be stable.

In the first embodiment of the present invention, the supporting unit is a frame made of metal line. The supporting unit 120 passes through the hole 112 and connect to the wall of the hole 112, the supporting unit 120 supports the bottom of the translucent case 22 of the translucent shell 20 (as shown in FIG. 3), and the supporting unit 120 clips the light emitting unit 30 (as shown in FIG. 4); whereby, when the electromagnetic sway module 50 sways, the supporting unit 120 can let the translucent case 22 of the translucent shell 20 and the light emitting unit 30 be stable via the supporting and the clipping of the supporting unit 120, to prevent the translucent case 22 and the light emitting unit 30 to be affected by the swaying of the electromagnetic sway module 50 and to be gradually loose.

As shown in FIG. 2 to FIG. 7, in the first embodiment of the present invention, the plurality of wires 60 are respectively electronically connected to the light emitting unit 30, the electromagnetic sway module 50, the circuit board 70 and the power unit 80 to electrically connect those units. The circuit board 70 is located in the case 10. The circuit board 70 is used for controlling the light emitting unit 30, the electromagnetic sway module 50 and the power unit 80 of the electric flameless candle 1. The power unit 80 is electrically connected to the light emitting unit 30, the electromagnetic sway module 50 and the circuit board 70; the power unit 80 is used for plugging to an external socket to obtain power and to provide power to the light emitting unit 30, the electromagnetic sway module 50 and the circuit board 70.

When the user wants to use the electric flameless candle 1 of the present invention, the user can plug the power unit 80 to the external socket to obtain the power. When the power unit 80 receives the power, the power unit 80 will send an activation signal to the circuit board 70 to activate the circuit board 70. After the circuit board 70 receives the activation signal, the circuit board 70 will control the power unit 80 to respectively transfer a first current and a second current to the first sway unit 51 and the second sway unit 52, wherein the directions of the first current and the second current are opposite. When the first sway unit 51 receives the first current, a first magnetic field will be generated. When the second sway unit 51 receives the second current, a second magnetic field will be generated; since the directions of the first current and the second current are opposite, the first magnetic field and the second magnetic field will repel each other (for example, the north pole of the first magnetic field is close to the north pole of the second magnetic field, such that the first magnetic field and the second magnetic field repel each other), whereby the repellent magnetic field will be formed between the first sway unit 51 and the second sway unit 52. The repellent magnetic field keeps the first sway unit 51 away from the second sway unit 52, allowing the first sway unit 51 to sway above the second sway unit 52. The swaying of the first sway unit 51 causes the translucent shell 20 to sway along the sway directions M, M' via the connecting unit 40. When the translucent shell 20 sways, the circuit board 70 will also control the light emitting unit 30 to emit light; therefore, the swaying translucent shell 20 and the shining light emitting unit 30 represent the shape of a candle flame and the effect of a candle flame swaying slightly in an air current.

Figure 8:
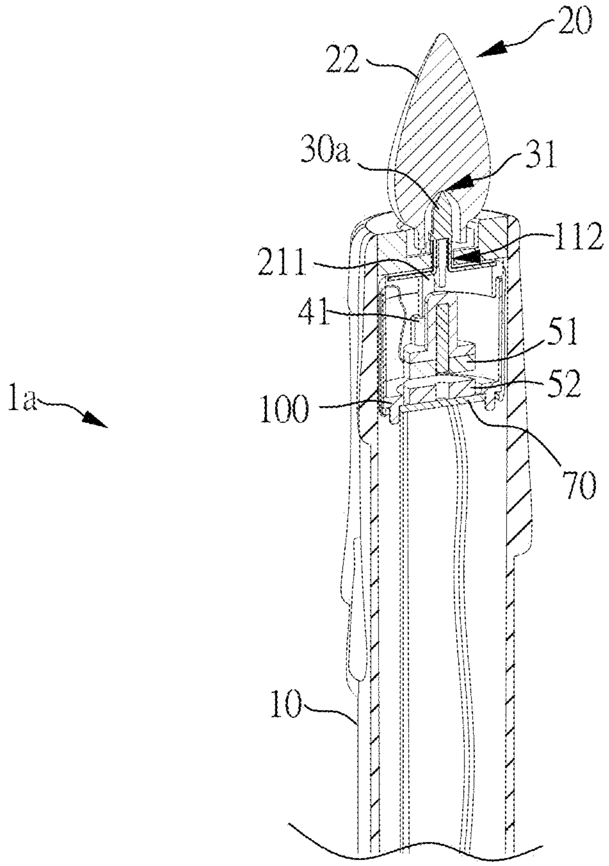
FIG. 8 illustrates a partial drawing of the electric flameless candle in the second embodiment of the present invention.

Please refer to FIG. 8 regarding the electric flameless candle of the present invention. FIG. 8 illustrates a partial drawing of the electric flameless candle in the second embodiment of the present invention.

As shown in FIG. 8 the difference between the first embodiment and the second embodiment is that, in the second embodiment, the electric flameless candle 1*a* does not include the supporting unit 120 (as shown in FIG. 3); furthermore, the light emitting unit 30*a* does not has the dome top, and the light emitting unit 30*a* includes a tip 31. The tip 31 touched and supports the bottom of the translucent shell 20; whereby, when the electromagnetic sway module 50 sways, the tip 31 can let the translucent case 22 of the translucent shell 20 be stable via the supporting, to prevent the translucent case 22 to be affected by the swaying of the electromagnetic sway module 50 and to be gradually loose.

Via the design of the electric flameless candle 1 of the present invention, the shape of a real candle flame and the effect of a candle flame swaying slightly in an air current can be represented, and the electric flameless candle 1 can emit the light without a flame, posing no risk of fire or air pollution.

In summary, regardless of the purposes, means and effectiveness, this invention is quite different from the known technology and should merit the issuing of a new patent. However, it is noted that the above-mentioned embodiments are only for illustrative purposes; the claims of the invention should depend on the claims and not be limited to the embodiments.

What is claimed is:

1. An electric flameless candle, comprising:

a case, comprising an opening;

a translucent shell positioning unit, located at the opening, wherein the translucent shell positioning unit comprises a positioning groove and a hole, the positioning groove is connected to the hole;

a translucent shell, located on the positioning groove of the translucent shell positioning unit, wherein the translucent shell comprises a translucent shell base and a translucent case, wherein the translucent shell base further comprises at least one base connecting unit;

a light emitting unit, located on the translucent shell base, and located in the translucent case;

a connecting unit, connected to the translucent shell base, wherein the connecting unit further comprises at least one correspondingly connecting unit, and the at least one base connecting unit passes through the hole to connect to the at least one correspondingly connecting unit;

an electromagnetic sway module, located in the case, wherein the electromagnetic sway module comprises:

a first sway unit, connected to the connecting unit, wherein when the first sway unit sways, the first sway unit causing the translucent shell to sway; and a second sway unit, located under the first sway unit;

a circuit board, located in the case; and a power unit, electrically connected to the light emitting unit, the electromagnetic sway module and the circuit board;

wherein when the electromagnetic sway module is energized, a repellent magnetic field is formed between the first sway unit and the second sway unit, the repellent magnetic field causes the first sway unit to sway above the second sway unit, and a swaying of the first sway unit causes the translucent shell to sway via the connecting unit.

2. The electric flameless candle as claimed in claim 1, further comprising a weight unit, the weight unit is connected to the connecting unit and the first sway unit.

3. The electric flameless candle as claimed in claim 2, further comprising a circuit board fastening unit, the circuit board fastening unit is located in the case and fastened to the circuit board.

4. The electric flameless candle as claimed in claim 3, further comprising a supporting unit, the supporting unit is connected to the translucent shell positioning unit, and the supporting unit supports the translucent shell.

5. The electric flameless candle as claimed in claim 4, wherein an amount of the at least one base connecting unit is two, and an amount of the at least one correspondingly connecting unit is two.

6. The electric flameless candle as claimed in claim 5, wherein the light emitting unit is a light emitting diode.

7. The electric flameless candle as claimed in claim 6, wherein the first sway unit and the second sway unit are coils.

8. The electric flameless candle as claimed in claim 6, wherein one of the first sway unit and the second sway unit is a magnet and the other one is a coil.

9. The electric flameless candle as claimed in claim 3, wherein the light emitting unit further comprises a tip, and the tip supports the translucent shell.

* * * * *